United States Patent [19]

Muskatello

[11] Patent Number: 5,985,195
[45] Date of Patent: Nov. 16, 1999

[54] ONE-STEP FLASHING BEVEL PROCESS FOR A CATHETER

[75] Inventor: James Muskatello, Southington, Conn.

[73] Assignee: Ethicon, Inc., Somerville, N.J.

[21] Appl. No.: 08/995,727

[22] Filed: Dec. 22, 1997

[51] Int. Cl.$^6$ .......................... B29C 39/04; B29C 67/00
[52] U.S. Cl. .................. 264/161; 264/163; 264/296; 264/322; 264/323; 425/393; 425/806
[58] Field of Search ................. 425/302.1, 806, 425/393; 264/161, 322, 296, 323, 163

[56] References Cited

U.S. PATENT DOCUMENTS

| Re. 24,784 | 2/1960 | Sherman | 264/163 |
|---|---|---|---|
| 3,990,825 | 11/1976 | Pasch et al. | 425/231 |
| 5,068,065 | 11/1991 | Maus et al. | 264/1.3 |
| 5,736,085 | 4/1998 | Brown et al. | 264/161 |
| 5,843,356 | 12/1998 | Patel et al. | 264/161 |

*Primary Examiner*—Jan H. Silbaugh
*Assistant Examiner*—Michael Poe
*Attorney, Agent, or Firm*—Joseph F. Shirtz

[57] ABSTRACT

A process for beveling the tip of a medical catheter is described. A catheter blank is mounted on a mandrel normally with the mandrel tip extending beyond the tip of the catheter to be beveled. The mandrel and catheter blank are inserted into a previously heated mold having a passage therethrough through which the mandrel passes. At a portion of the mold at which the terminus of the catheter is to be formed, a constriction is provided through which material (flash) may pass from the mold volume to the outside of the mold. The material is permitted to cool sufficiently such that when the mandrel and catheter are withdrawn from the mold, the flash tears and separates from the catheter at the point of the constriction formed between the mold and the mandrel.

14 Claims, 2 Drawing Sheets

ONE-STEP FLASHING BEVEL PROCESS FOR A CATHETER

FIELD OF THE INVENTION

The invention relates to a process for forming medical devices, and in particular, a process for forming tapered tips on catheters.

BACKGROUND OF THE INVENTION

It has long been known to taper the tip of a catheter, in particular, a peripherally inserted intravenous catheter in order to ease the insertion process. It has further been found that a dual bevel formed at the catheter tip eases such insertion and greatly improves the insertion process. The first bevel is a taper of approximately 3° and the second bevel is a taper of approximately 27°.

These tips may be formed, for example, by laser cutting as shown in U.S. Pat. No. 5,425,903, or by molding as shown in U.S. Pat. No. 4,661,300 to Daugherty.

The Daugherty patent shows a molding process in which a single step operation is used to form and clip the catheter. That is, the catheter is placed on a mandrel with the catheter material extending beyond the mandrel and this assembly is then inserted into a heated mold to form the outer surface of the catheter. The mandrel is advanced to a point where it engages the mold surface to clip the flash from the catheter in a single step.

The single step process, however, has significant disadvantages as it provides for short tool life, as both the mold and the mandrel are used as cutting devices and therefore must engage and wear upon each other. This means that during usage, the outer surface formed on the catheter varies as the contact between the mandrel and the die wears upon the inner surface of the die. Furthermore, tooling must be replaced in order to maintain a sharp edge on the mandrel to provide appropriate cutting action.

SUMMARY OF THE INVENTION

In the present invention, a process is used for forming a beveled tip on a catheter. This process essentially uses an intentionally flashed mold, that is, a mold wherein the mold is intentionally overfilled and therefore caused to flash followed by a separation of the molded part from the mold causing the flash to tear away from the molded part. In order to enhance and predetermine the location of the separation of the flash from the molded part, a constriction is called for in the molding process that creates a weakened portion of the connection between the flash and the molded part. Upon separation, the part tends to separate from the flash at this point leaving a suitable beveled tip.

In the process, a catheter blank is mounted on a mandrel. A mold is provided that has a predetermined tapered inner surface which corresponds to the tapered tip desired on the catheter. At the distal zone of this tapered inner surface, there is provided a section having a constriction around an opening that communicates between the volume of the mold having the inner surface and an outer volume of the mold referred to as a collection zone. The mold is heated, either by means of a heating block or other means, and the catheter blank and mandrel are moved into the mold either by moving the mold relative to the blank and mandrel, or moving the mandrel relative to the mold. In this way the catheter blank is heated by the mold and begins to flow as the catheter material is inserted into the mold. The flow of material flows beyond the constriction and forms flash on the collection side of the constriction, that is, the side opposite from the tapered inner surface.

After the flash has been intentionally formed as described above, the flash and mold are permitted to cool sufficiently to permit the flash to harden at least slightly. The flash needs to harden only a sufficient amount to prevent its repassage beyond the constriction upon removal of the molded part. Thereafter the mold and mandrel are separated causing the flash to tear away from the molded part at the point of the described constriction. The inner taper may be, for example, a 3° taper or a 27° taper. In certain situations it may even be desirable for the tip to have a more blunt end.

During the process the mold is heated to a temperature of from about 500° F. to about 700° F.

The constriction described may take the form of a continuous circumferential edge such as a ridge formed on the inside of the mold. That is, an apex formed by the tapered inner surface of the mold and a tapered surface provided in the collection zone of the mold which intersect to form a ring. Alternatively, the constriction may be a cylindrical surface within the mold generally of very short length in order to control the location of the separation between the flash and the molded product. It can easily be seen that in the cylindrical constriction embodiment of the invention that the flash may separate at any point along the cylindrical surface.

In the process, the surface provided to the catheter may have a dual bevel. That is, a bevel of approximately 3° along a portion of its length terminating in a bevel of between 20° and 35° and most preferably 27°.

It has been found that the process is particularly useful on fluoropolymers catheters, that is, catheters made of products such as those sold under the trademark TEFLON™, and TEFZEL, and polyurethane catheters, this is, catheters made of products sold under the trademark OCRILON. In such a situation the mold is heated to a temperature of approximately 700° F. Additionally, a blast of cooling air may be provided in order to cool the flash and mold during the process. This air may blow on the mold and the cooling of the mold cools the flash, or may blow directly on the flash in order to assist in the cooling of the flash in order to solidify it more quickly. Finally the process may also call for a blast of gas or air blowing upward through the mold from the mandrel entry side in order to blow the flash off the top collection zone of the mold.

BRIEF DESCRIPTION OF THE DRAWINGS

The invention will now be described with reference to the attached drawings wherein.

DESCRIPTION OF THE PREFERRED EMBODIMENTS

Figure 1:
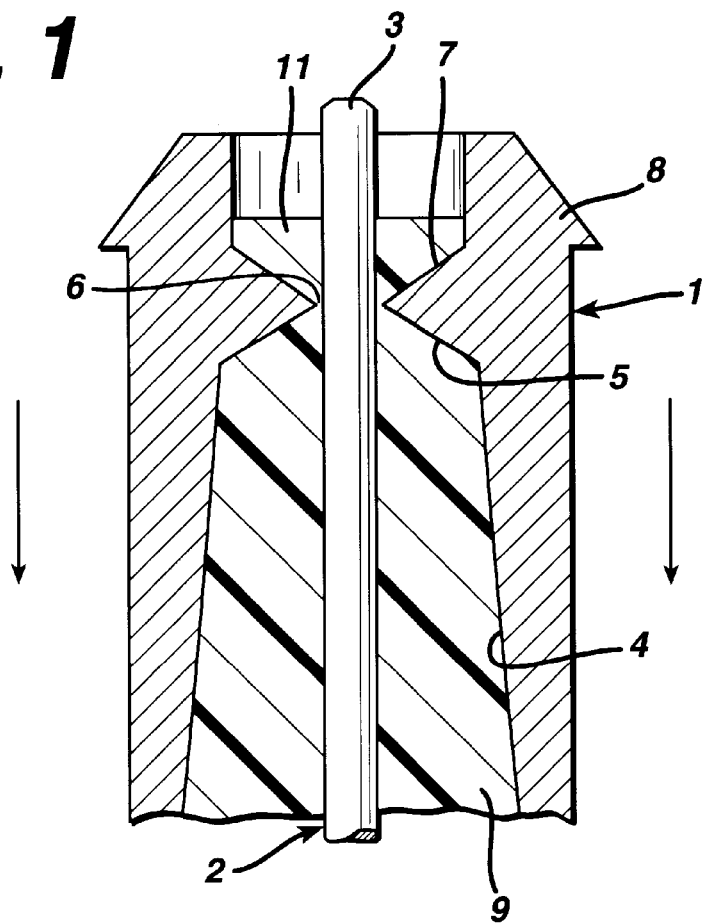
FIG. 1 is a depiction of the molding process of the present invention after the catheter to be formed has been inserted into the mold.

In forming a catheter, it is known to have a tubular preform either attached to or separate from a hub provided during the manufacturing process. The description of extruding the tube and attaching it to such a hub or lure fitting is well-known in the art. At the point in the process at which the beveling of the tip occurs, a mold 1 is provided with a cooperating mandrel 2. The mandrel 2 has a distal end 3 and the mold 1 and mandrel 2 are moveable with respect to one another along the axis of the mandrel 2.

The mold 1 defines an inner molding zone or mold cavity which is defined in part by first taper inner surface 4 and in part by second taper inner surface 5.

First taper inner surface 4 tapers at approximately a preferred angle of 3° to the axis of the mold. The second taper inner surface 5 tapers at an angle of approximately 27° to the mold. The mandrel and mold are sized such that the second taper surface 5 terminates at a small gap from the outer surface of the mandrel, thus forming a constriction 6. The importance of this constriction 6 shall become clear below.

Beyond the constriction 6, the mold 1 provides a collection surface 7 forming a zone that will receive material. Adjacent to the collection surface 7, the mold forms a heat mass 8 by having a conical outer shape providing additional material in order to retain heat for the molding process.

In operation, a catheter 9 is received on the mandrel 2 normally with the distal end 3 extending beyond the distal end of the catheter material.

The mold 1 is heated to a desired temperature. For example, a temperature of approximately 650° F. or at least having a range of from 600° F. to 700° F. is preferred when a catheter material of fluoropolymers is used. It will easily be seen by one of ordinary skill in the art that other materials such as polyurethane may also be used in the process with adjustments to the mold temperature and certain dimensions of the mold.

After the mold 1 has been heated to approximately the desired temperature, the mandrel 2 with the catheter 9 provided thereon is received within the mold 1. As the catheter material comes into proximity or contact with the first taper surface 4, the catheter material begins to soften, and to some degree, flow. As the catheter is inserted further into the mold, catheter material flows through the constriction 6 and collects in the zone partially defined by the collection surface 7. During this process the mold 1 is naturally cooling or may be assisted in its cooling by a blast of air not shown in the figures.

Figure 2:
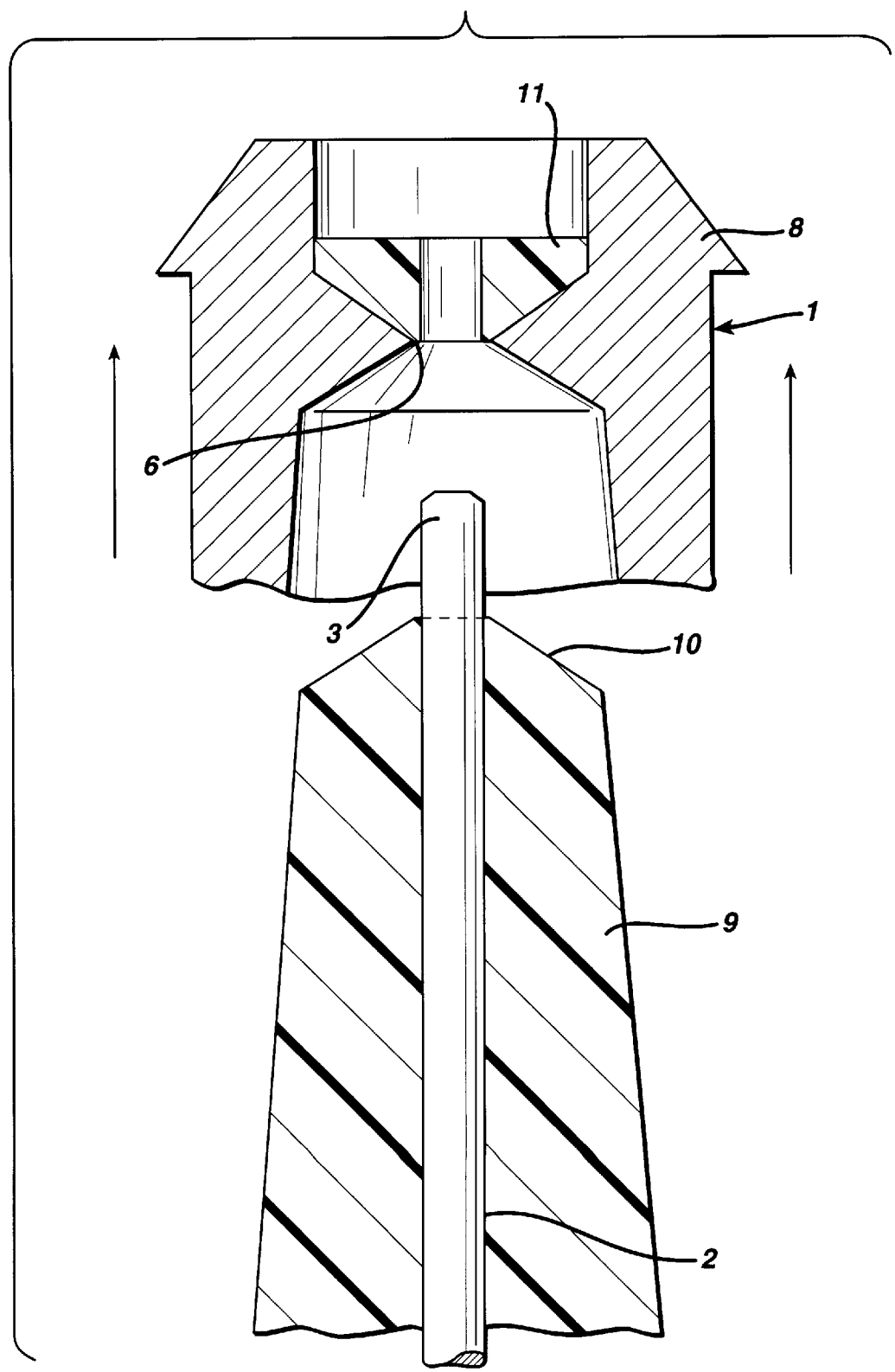
FIG. 2 is a depiction of the molding process after the mold and catheter tip have been separated.

Once the catheter material has flowed past the constriction 6, it is clear that the required filling of the mold portion defined by first taper inner surface 4 and second taper inner surface 5 has occurred. Once the catheter material has sufficiently cooled, the mold and mandrel are separated as indicated in FIG. 2. The construction 6 provides a weak point in the molded material and the separation of the mold from the mandrel causes a separation of the flash 11 from the catheter tip 10. As the constricted portion 6 is the weakest portion of the formed catheter, the removal of the mold will preferentially cause a separation of the catheter material from the flash at this point.

Figure 3:
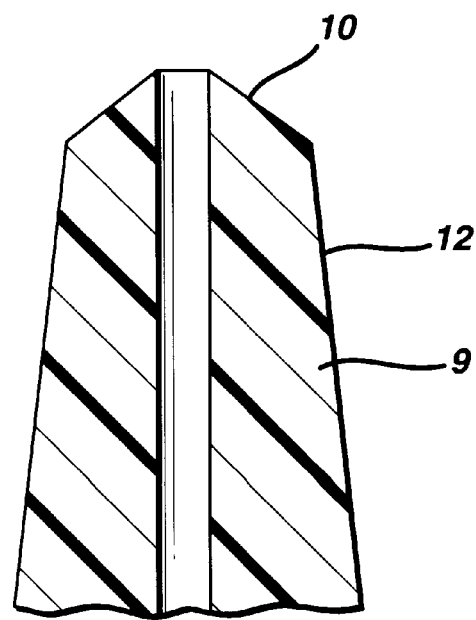
FIG. 3 is a depiction of the formed catheter tip of the process of the present invention.

As is clear from the discussion above, the constriction 6 is provided with very close tolerance. However, there is little or no contact provided between the mandrel 2 and the mold in the area of constriction 6. In this way, the tools (mandrel 2 and mold 1) do not wear significantly as there is little or no contact during the process. After the forming process, the mandrel 2 is removed from the catheter and a catheter tip as shown in FIG. 3 is provided wherein the catheter material 9 has been beveled to have a catheter tip 10 with a 27° taper and a outer surface 12 having a 3° taper.

As a representative product, a 20 gauge catheter may be formed out of a tube having an outer diameter of 0.0435 inches. The mandrel 2 has a diameter of 0.0282 inches and is inserted into the catheter. The mold forms a constriction zone 6 having a gap of approximately 0.0005 inches dimension.

It can easily be seen from the foregoing description that the collection surface 7 may merely be the top of the mold itself as long as the material after it passes through the constriction zone 6 spreads and sufficiently solidifies to prevent its repassage through the constriction zone upon separation of the mandrel and mold.

Other modifications of the invention may be made without departing from the spirit and scope of the present invention. For example, other catheter materials may be used and other mold materials.

I claim:

1. A process for forming a beveled tip on a catheter comprising
   a) mounting a catheter blank on a mandrel;
   b) providing a mold having a predetermined tapered inner surface, and a zone having a constriction between said inner surface and a collection zone;
   c) heating said mold;
   d) moving said catheter blank and mandrel relative to said mold to cause said catheter blank to be heated, shaped by said tapered inner surface, and to flow through said constriction and form flash on a side of said constriction opposite said tapered inner surface in said collection zone;
   e) permitting said flash to cool sufficiently to prevent a substantial portion of said flash from passing back through said constriction; and
   f) separating said mold and mandrel to cause said catheter blank to tear at said constriction to separate said flash from the remainder of said catheter blank having said beveled tip.

2. The process according to claim 1 wherein there is an additional different tapered inner surface between said predetermined inner surface and said constriction.

3. The process according to claim 1 wherein said mold is heated to a temperature of from 500° F. to 700° F.

4. The process according to claim 1 wherein said constriction is formed by a cylindrical surface of said mold.

5. The process according to claim 1 wherein said tapered inner surface tapers at about 27°.

6. The process according to claim 5 wherein said constriction is formed in part by a circumferential edge.

7. A process of forming a beveled tip on a plastic catheter comprising:
   a) mounting a catheter blank on a mandrel to form a subassembly with a distal end of the mandrel extending beyond a tip of said blank to be formed;
   b) heating a mold having a desired beveled inner surface and a mandrel passage defined therethrough, said mold further including
      i) a constricted portion at least partially defining said mandrel passage at a point distal to said beveled inner surface; and
      ii) a distal opening beyond said constricted portion;
   c) moving said mold and said subassembly relative one another such that said subassembly is received within said mold with said distal end of said mandrel passing through said constricted portion to heat said catheter blank to cause its material to flow;
   d) shaping said material by said beveled inner surface and flowing said material through said constricted portion to create flash on a side of said constricted portion opposite said beveled inner surface in said distal opening;
   e) permitting said flash to cool sufficiently to prevent a substantial portion of said flash from returning through said constricted portion upon removal of said mandrel from said mold; and f) removing said subassembly from said mold to cause said flash to separate from said catheter having said beveled tip at a point adjacent said constriction.

8. The process according to claim 7 wherein said constricted portion is formed partially from a substantially linear circumferential edge.

9. The process according to claim 7 wherein said constricted portion is formed partially from a cylindrical inner mold surface.

10. The process according to claim 7 further including the application of cooling fluid to said mold to permit said flash and said catheter blank to cool.

11. The process according to claim 7 wherein said beveled inner surface tapers at an angle from approximately 20° to 35°.

12. The process according to claim 11 wherein said angle is approximately 27°.

13. The process according to claim 7 wherein said catheter blank is formed at least partially of fluoropolymer.

14. The process according to claim 13 wherein said mold is heated to an internal surface temperature of from 500° F. to 700° F.

* * * * *